United States Patent [19]

Ohyoshi et al.

[11] 4,035,210

[45] July 12, 1977

[54] TREATING METHOD FOR GIVING DURABILITY TO AN OPTICAL FIBER BUNDLE

[75] Inventors: Kaoru Ohyoshi, Hachiouji; Naoyuki Seo, Kokubunji, both of Japan

[73] Assignee: Olympus Optical Co., Ltd., Japan

[21] Appl. No.: 562,946

[22] Filed: Mar. 28, 1975

[30] Foreign Application Priority Data

Mar. 30, 1974 Japan .................. 49-36392

[51] Int. Cl.² .................................. C03C 15/00
[52] U.S. Cl. ...................... 156/645; 65/31; 134/3; 134/28; 134/34; 156/657; 156/662; 427/57; 427/163; 427/307
[58] Field of Search ............ 65/3 A, 31, DIG. 7; 134/3, 28, 34; 156/8, 15, 24, 25, 5, 155, 180, 280, 296; 350/96 B; 427/57, 163, 307, 309

[56] References Cited

U.S. PATENT DOCUMENTS

| | | | |
|---|---|---|---|
| 2,311,704 | 2/1943 | Simison | 156/296 |
| 3,004,368 | 10/1961 | Hicks, Jr. | 156/24 |
| 3,050,907 | 8/1962 | Hick et al. | 65/31 X |
| 3,554,721 | 1/1971 | Gardner | 65/3 A |
| 3,624,816 | 11/1971 | Strack et al. | 350/96 B |
| 3,669,772 | 6/1972 | Strack | 156/15 |

FOREIGN PATENT DOCUMENTS

| | | | |
|---|---|---|---|
| 339,516 | 1/1970 | U.S.S.R. | 65/31 |

*Primary Examiner*—William A. Powell
*Attorney, Agent, or Firm*—Cushman, Darby & Cushman

[57] ABSTRACT

A treating method for giving durability to an optical fiber bundle produced by bundling optical fibers respectively covered by acid-soluble glass, shielding both end portions thereof by acid-resisting material and dissolving and removing said acid-soluble glass at the middle portion by means of acid. That is, said optical fiber bundle is immersed in organic solvent containing antifriction agent and is subjected to ultrasonic oscillation for the purpose of removing sludge remaining in said optical fiber bundle and replacing said sludge with said antifriction agent.

14 Claims, 5 Drawing Figures

4,035,210

TREATING METHOD FOR GIVING DURABILITY TO AN OPTICAL FIBER BUNDLE

BACKGROUND OF THE INVENTION a. Field of the Invention

The present invention relates to a treating method for an optical fiber bundle and, more particularly, a treating method for giving durability especially to an optical fiber bundle for which respective fibers thereof are firmly fixed together at its end portions and, at the same time, are separated from each other at its middle portion other than end portions so that said optical fiber bundle will have flexibility.

b. Description of the Prior Art

For an image guide or the like used, for example, for an endoscope, it is necessary to fix respective fibers together, at both end portions of the image fiber, so that respective fibers will be kept in identical geometrical patterns at both end portions in order to transmit the image focused on one end face of the image guide to the opposite end face so that a clear-cut and correct image can be obtained on said opposite end face. Besides, it is necessary to arrange the endoscope so that it can be inserted to any desired portion in order to make it possible to observe any such portion. Therefore, the image fiber to be used for the endoscope should have as far as possible high flexibility at its middle portion other than its both end portions. Consequently, for the image fiber, it is so required that respective fibers are kept separated from each other at its middle portion.

To meet the above-mentioned requirement, optical fiber bundles prepared by a method as described below are known. That is, as shown in FIG. 1, an optical fiber 4 is prepared by providing a layer 3 of acid-soluble glass on the outer surface of known optical fiber consisting of a light-conducting core 1 made of glass having a comparatively high refractive index and cladding 2 made of glass having a comparatively low refractive index and provided on the outer surface of the core 1. Many of said optical fibers 4 are bundled together, and is drawn by heating by a heater as shown in FIG. 2. Thus, a rod-type fiber bundle 5 is formed. After covering both end portions of said rod-type fiber bundle 5 with acid-resisting material, the rod-type fiber bundle 5 is immersed in acid in order to dissolve and remove the layer 3 of acid-soluble glass covering the middle portion of each fiber 4 except for those covering both end portions. As a result, respective fibers designated by numeral 4' in FIG. 4 are separated from each other at the middle portion and a flexible optical fiber bundle is obtained. The optical fiber bundle 5 made by the method as described in the above has, as shown in FIG. 3, both end portions 5a and 5b at which respective fibers are fixed together and a middle portion 5c at which respective fibers are separated from each other. For the most part of the middle portion 5c at which respective fibers 4' are separated from each other, acid-soluble glass layers 3 are dissolved by acid and removed completely. However, at portions adjacent to border lines between the middle portion 5c where respective fibers are separated from each other and both end portions 5a and 5b, sludge 6 of glass which is not completely dissolved by acid remains unremoved because acid does not sufficiently permeate into interstices between respective fibers at such portions. (Refer to FIG. 4.) The amount of such sludge 6 becomes larger at portions closer to said border lines. (When glass containing $SiO_2$ is used as said acid-soluble glass, said sludge 6 also contains $SiO_2$, etc. which are comparatively insoluble in acid.) To eliminate such sludge 6 which remains unremoved, it is preferable to make the acid-soluble glass layer 3 provided to each fiber 4 thicker. When, however, the layer 3 is made thicker, the ratio of the portion which is not useful for light conducting becomes larger and, therefore, the light-conducting efficiency decreases. In practice, the layer 3 is therefore made as thin as possible and its thickness is about $1\mu$ to $5\mu$ in general. Consequently, it is impossible to eliminate the above-mentioned sludge 6 completely.

As described in the above, respective fibers of this kind of optical fiber bundle are fixed together at their both end portions 5a and 5b and cannot be moved at all. On the other hand, at those portions of the middle portion 5c which are close to the above-mentioned border lines, respective fibers can be moved as acid-soluble glass is partially removed though their movement is somewhat restricted because the above-mentioned sludge 6 exists. Moreover, this kind of optical fiber bundle are frequently bent when using as described already. When the optical fiber bundle is bent, stress is concentratively applied to portions near the above-mentioned border lines between the separated portion 5c and fixed portions 5a and 5b. Consequently, respective optical fibers have strong tendency to be broken at those portions near the border lines. Even if stress applied to portions close to said border lines is not so large to cause breakage to fibers, respective fibers are injured, when they are bent, because of the sludge such as acid-soluble glass which was not dissolved completely, $SiO_2$, etc. in case such sludge exists between respective fibers and, therefore, respective fibers become susceptible to breakage. Moreover, if said sludge exists as lumps between respective fibers, the bent fibers are subjected to an extremely large concentrated stress at the position where such lump of sludge exists and, therefore, tend to be broken.

SUMMARY OF THE INVENTION

It is, therefore, a primary object of the present invention to provide a treating method for giving durability to an optical fiber bundle having both end portions where respective optical fibers are fixed together and a middle portion where respective fibers are separated from each other, said optical fiber bundle being made by bundling optical fibers respectively covered by acid-soluble glass and by dissolving and removing said acid-soluble glass by immersing bundled optical fibers in acid after shielding both end portions thereof, said treating method for giving durability comprising a technique to immerse said optical fiber bundle in liquid containing an antifriction agent and to give ultrasonic oscillation to said liquid for the purpose of removing sludge of acid-soluble glass existing between respective fibers and of replacing said sludge with said antifriction agent.

DETAILED DESCRIPTION OF THE PREFERRED EMBODIMENT

Figure 1:
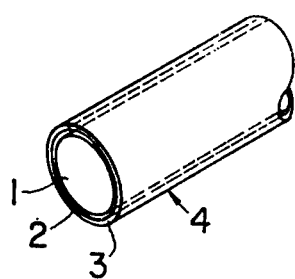
FIG. 1 through FIG. 4 respectively show respective processes of the known producing method of optical fiber bundles.
Figure 2:
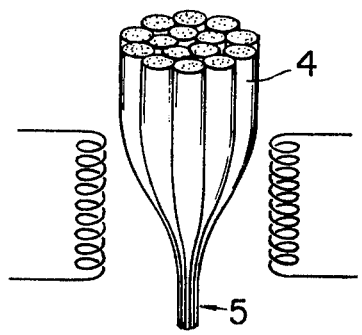
Figure 3:
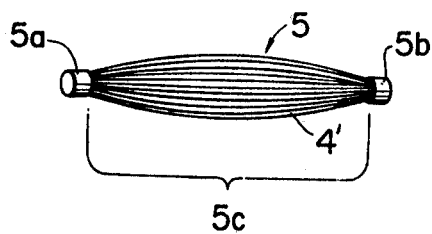
Figure 4:
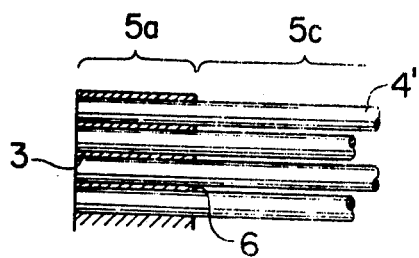
Figure 5:
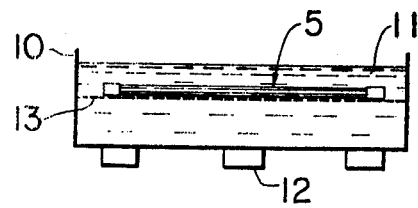
FIG. 5 shows a sectional view illustrating an outline of a device to be used in the treating method according to the present invention.

In FIG. 5, numeral 10 designates a vessel in which organic solvent 11 is filled. In said organic solvent, powder of lubricant or antifriction agent is mixed. Numeral 12 designates an ultrasonic oscillator. Numeral 13 designates a supporting net stretched in said vessel 10 for the purpose of placing thereon the optical fiber bundle 5 formed by the method described already in which sludge of acid-soluble glass is remaining between respective optical fibers as shown in FIG. 4.

When the optical fiber bundle 5 obtained by the afore-mentioned producing process and having sludge 6 between respective fibers is placed on said supporting net 13 in said vessel 10 and ultrasonic oscillation of about 20 through 100 kHz is given, said sludge 6 of acid-soluble glass is removed from interstices between respective fibers by means of said ultrasonic oscillation and, at the same time, particles of antifriction agent or lubricant contained in said solution of organic solvent permeate into said interstices from which said sludge is removed.

As the organic solvent to be used for treatment described in the above, those listed below may be used.

xylene, trichloroethylene, perchloroethylene, acetone, ethyl ether, alcohol, ether, amyl acetate, butyl acetate, benzene, methyl ethyl ketone, butyl alcohol, cyclohexane, ethyl acetate, ethyl alcohol, metyl isobutyl ketone, metyl acetate, metyl alcohol, isopropyl alcohol, toluene.

For said treatment, it is preferable to use such organic solvent which does not dissolve constituents of glass constituting optical fibers and which dries quickly. For this reason, it is especially preferable to use xylene, trichloroethylene, perchloroethylene, acetone, and ethyl ether out of organic solvents listed in the above. Moreover, as water is not preferable because it dissolves glass partially, it is necessary to use absolute alcohol when using alcohol as organic solvent.

As the antifriction agent to be mixed in said organic solvent, it is possible to use those listed below.

$MoS_2$, BN, talc, fluorine-contained resin, graphite, carbon, $MoSe_2$, $WS_2$, $WSe_2$, $MoTe_2$, $WTe_2$, $NbS_2$, $NbSe_2$, $NbTe_2$, $TaS_2$, $TaSe_2$, $TaTe_2$, $Cr_2S_3$, $Cr_2SE_3$, $Cr_2Te_3$, $VS_2$, $VSe_2$, $VTe_2$, $BaF_2$, $CaF_2$, $SrF_2$, $SiO$, $TiO_2$, $Mo_2O_3$, $CoO$, BC, Ti, Zr, Hf, Re, Th, U.

Said antifriction agent has to be stable against organic solvent and, moreover, it has to be in the form of very fine particles for the purpose of permeating into extremely small interstices between respective fibers. For these reasons, it is more preferable to use molybdenum disulfide, boron nitride, talc, fluorine-contained resin, and graphite. Especially, molybdenum disulfide is most preferable because it can be obtained in particle size of $1\mu$ or less and with stable particle size. Moreover, though its specific gravity is comparatively large, i.e., 4.7, it can be uniformly distributed in solution by means of ultrasonic oscillation without sedimenting. Therefore, it can be satisfactorily permeated into small interstices between respective fibers.

When the above-mentioned treatment is carried out for a large number of optical fiber bundles, the amount of sludge removed by said treatment from interstices between respective fibers of fiber bundles and contained in said organic solvent increases gradually and, consequently, the replacing efficiency of sludge and antifriction agent decreases. Therefore, it is preferable to prepare two or three treating vessels and to treat fiber bundles by transferring them from one vessel to another in turn. Thus, the above problem can be solved and satisfactorily treated bundles can be obtained finally. As an alternative solution for the above problem, it is also possible to take the following method. That is, two treating vessels are prepared: one is a small treating vessel which can accommodate only end portions of the fiber bundle and portions close to said end portions where large amount of sludge exists, and the other is a large treating vessel in which the fiber bundle as a whole can be immersed. In the small treating vessel, only end portions of the fiber bundle and portions close to said end portions are treated at first. After most of sludge existing at said portions close to end portions is replaced with antifriction agent, the fiber bundle is finally treated in the large treating vessel. In this case, organic solvent in the small treating vessel for treating said portions close to end portions may be changed frequently.

The above explanation is given for the case to permeate particles of lubricant or antifriction agent into interstices between respective fibers from which sludge is removed. This treating method may be also utilized as a means to permeate liquid lubricant into interstices between respective fibers. Even when the optical fiber bundle is immersed in liquid lubricant, it is very difficult to permeate liquid lubricant, into interstices between respective fibers, for example, at portions very close to shielded end portions of the optical fiber bundle. However, by the treating method according to the present invention, i.e., by giving ultrasonic oscillation, even a lubricant having comparatively high viscosity can be reliably permeated without leaving bubbles even into the above-mentioned portions into which it is difficult to permeate lubricant by known methods. As the liquid lubricant to be used in this case, silicone oil is suitable.

By the treating method according to the present invention, it is possible to completely remove sludge existing between respective fibers of an optical fiber bundle having respective fibers separated from each other at its middle portion and produced by utilizing acid-soluble glass and, at the same time, to replace said sludge with lubricant or antifriction agent. Therefore, it is possible to produce an optical fiber bundle having very high strength against bending.

We claim:

1. A method for giving durability to an optical fiber bundle produced by bundling optical fibers respectively covered by acid-soluble glass comprising; shielding both end portions of said optical fiber bundle with shielding means made of an acid-resistant material, dissolving said acid-soluble glass at the middle portion by immersing said optical fiber bundle in acid solution while the shielded acid-soluble glass on said end portions remains intact, and immersing said optical fiber bundle in an organic solvent containing an antifriction agent, the sludge remaining between respective optical fibers thereby being removed and, at the same time, is replaced with said antifriction agent in the presence of ultrasonic oscillation applied to said organic solvent.

2. A treating method for giving durability to an optical fiber bundle according to claim 1 in which xylene is used as said organic solvent.

3. A treating method for giving durability to an optical fiber bundle according to claim 1 in which trichloroethylene is used as said organic solvent.

4. A treating method for giving durability to an optical fiber bundle according to claim 1 in which perchloroethylene is used as said organic solvent.

5. A treating method for giving durability to an optical fiber bundle according to claim 1 in which acetone is used as said organic solvent.

6. A treating method for giving durability to an optical fiber bundle according to claim 1 in which ethyl ether is used as said organic solvent.

7. A treating method for giving durability to an optical fiber bundle according to claim 1 in which molybdenum disulfide is used as said antifriction agent.

8. A treating method for giving durability to an optical fiber bundle according to claim 1 in which boron nitride is used as said antifriction agent.

9. A treating method for giving durability to an optical fiber bundle according to claim 1 in which talc is used as said antifriction agent.

10. A treating method for giving durability to an optical fiber bundle according to claim 1 in which fluorine-contained resin is used as said antifriction agent.

11. A treating method for giving durability to an optical fiber bundle according to claim 1 in which graphite is used as said antifriction agent.

12. A method for giving durability to an optical fiber bundle produced by bundling optical fibers respectively covered by acid-soluble glass comprising; shielding both end portions of said optical fiber bundle with shielding means made of an acid-resistant material, dissolving and removing said acid-soluble glass at the middle portion, by immersing said optical fiber bundle in acid solution while the shielded acid-soluble glass on said end portions remains intact, intact immersing both end portions of said optical fiber bundle and portions close to both of said end portions in an organic solvent containing an antifriction agent whereby sludge remaining between respective optical fibers at said portions close to said both end portions is removed and thereafter immersing the whole optical fiber bundle in an organic solvent containing an antifriction agent wherein any sludge remaining between respective optical fibers is finally removed and, at the same time, is replaced with said antifriction agent by providing ultrasonic oscillation to said organic solvent.

13. A treating method for giving durability to an optical fiber bundle produced by bundling optical fibers respectively covered by acid-soluble glass comprising; shielding both end portions of said optical fiber bundle with shielding means made of acid-resistant material, dissolving and removing said acid-soluble glass at the middle portion by immersing said optical fiber bundle in acid solution while the shielded acid-soluble glass on said end portions remain intact, and thereafter immersing said optical fiber bundle in liquid lubricant, whereby the sludge remaining between respective optical fibers is removed and, at the same time, said liquid lubricant is permeated into interstices between said respective optical fibers by providing ultrasonic oscillation to said liquid lubricant.

14. At treating method for giving durability to an optical fiber bundle according to claim 13 wherein silicone oil is used as the liquid lubricant.

* * * * *